United States Patent
O'Brien et al.

(10) Patent No.: US 10,126,746 B2
(45) Date of Patent: Nov. 13, 2018

(54) AUTONOMOUS DRONE AND TOOL SELECTION AND DELIVERY

(71) Applicant: Wal-Mart Stores, Inc., Bentonville, AR (US)

(72) Inventors: John J. O'Brien, Farmington, AR (US); David C. Winkle, Bella Vista, AR (US); Michael D. Atchley, Springdale, AR (US); Nicholas Ray Antel, Springdale, AR (US); Donald R. High, Noel, MO (US); Brian G. McHale, Chadderton Oldham (GB); Todd D. Mattingly, Bentonville, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 15/829,427

(22) Filed: Dec. 1, 2017

(65) Prior Publication Data
US 2018/0157258 A1 Jun. 7, 2018

Related U.S. Application Data

(60) Provisional application No. 62/428,619, filed on Dec. 1, 2016.

(51) Int. Cl.
*G05D 1/00* (2006.01)
*G06Q 30/02* (2012.01)

(52) U.S. Cl.
CPC ......... *G05D 1/0088* (2013.01); *G05D 1/0027* (2013.01); *G06Q 30/0282* (2013.01)

(58) Field of Classification Search
None
See application file for complete search history.

(56) References Cited

U.S. PATENT DOCUMENTS 7,341,224 B1 3/2008 Osann, Jr.
8,038,090 B2 10/2011 Wilson
(Continued)

FOREIGN PATENT DOCUMENTS

GB 2530626 3/2016
WO 2000054433 9/2000
(Continued)

OTHER PUBLICATIONS

PCT; App. No. PCT/US2017/064131; International Search Report and Written Opinion dated Feb. 15, 2018.

*Primary Examiner* — Rami Khatib
(74) *Attorney, Agent, or Firm* — Fitch, Even, Tabin & Flannery LLP

(57) ABSTRACT

In some embodiments, apparatuses and methods are provided herein useful to selecting tools and drones for completing a task. In some embodiments, the system comprises an autonomous vehicle configured to transport the tools and the drones including a plurality of sensors configured to detect properties of the tools and the drones, the drones, the tools, and a control circuit configured to receive, from the sensors, indications of the properties of the tools and the drones, select, based on the service requests and the indications of the properties of the tools and the drones, at least one of the tools and at least one of the drones to perform at least one of the service requests, cause the at least one of the drones to be equipped with the at least one of the tools, and transmit instructions that are based on the at least one of the service requests.

20 Claims, 3 Drawing Sheets

(56) References Cited

U.S. PATENT DOCUMENTS

| | | |
|---|---|---|
| 9,193,458 B2 | 11/2015 | Pongratz |
| 9,550,577 B1 | 1/2017 | Beckman |
| 9,573,684 B2 | 2/2017 | Kimchi |
| 2009/0294573 A1 | 12/2009 | Wilson |
| 2012/0226394 A1 | 9/2012 | Marcus |
| 2014/0303814 A1 | 10/2014 | Burema |
| 2014/0350725 A1 | 11/2014 | LaFary |
| 2015/0120094 A1 | 4/2015 | Kimchi |
| 2015/0274294 A1 | 10/2015 | Dahlstrom |
| 2015/0277440 A1 | 10/2015 | Kimchi |
| 2016/0196755 A1 | 7/2016 | Navot |
| 2016/0244163 A1 | 8/2016 | Peeters |
| 2016/0257401 A1 | 9/2016 | Buchmueller |
| 2017/0022015 A1* | 1/2017 | Gollu .................... G05B 15/02 |
| 2017/0110017 A1 | 4/2017 | Kimchi |
| 2017/0129603 A1* | 5/2017 | Raptopoulos ......... B64C 39/024 |
| 2018/0017972 A1* | 1/2018 | Chefalas .............. G05D 1/0088 |
| 2018/0075760 A1* | 3/2018 | Thompson ............ G08G 5/0082 |

FOREIGN PATENT DOCUMENTS

| | | |
|---|---|---|
| WO | 2014080385 | 5/2014 |
| WO | 2014080386 | 5/2014 |
| WO | 2015051436 | 4/2015 |

* cited by examiner

AUTONOMOUS DRONE AND TOOL SELECTION AND DELIVERY

CROSS-REFERENCE TO RELATED APPLICATION

This application claims the benefit of U.S. Provisional Application No. 62/428,619, filed Dec. 1, 2016, which is incorporated by reference in its entirety herein.

TECHNICAL FIELD

This invention relates generally to service drones and, more specifically, autonomous delivery of drones.

BACKGROUND

As everyday life gets busier and busier for many people, automated solutions to everyday tasks can provide relief. For example, if everyday chores were completed by automated systems, people would have more time to partake in activities that they enjoy. While some automated devices exist (e.g., vacuum systems), these devices are extremely task-specific and thus provide little or no versatility. Consequently, a need exists for more advanced systems that are capable of providing tools for, and adapting to, a large variety of tasks.

BRIEF DESCRIPTION OF THE DRAWINGS

Disclosed herein are embodiments of systems, apparatuses and methods pertaining selecting tools and drones for completing a task. This description includes drawings, wherein.

Figure 1:
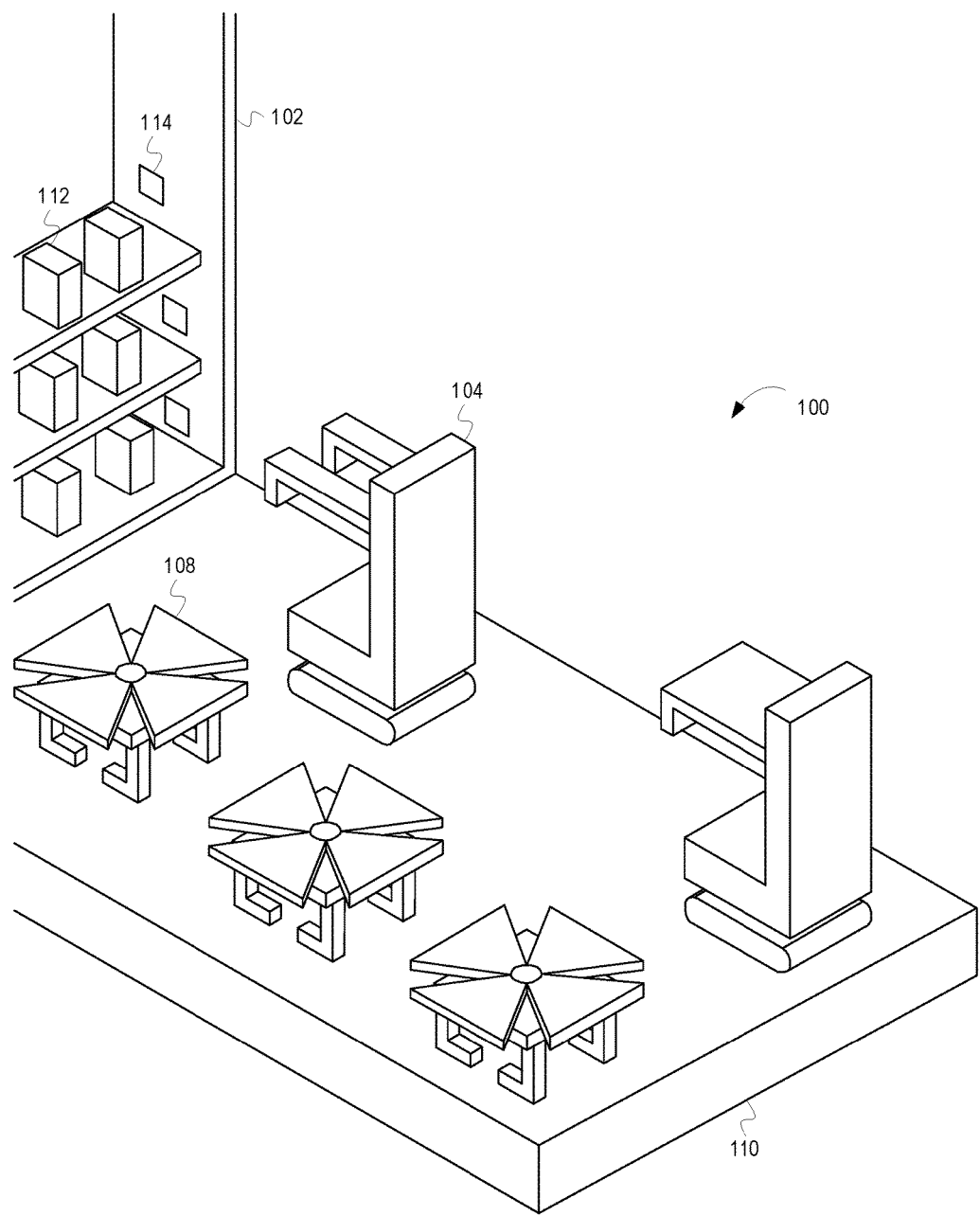
FIG. 1 depicts a portion of an autonomous vehicle 110 transporting drones and tools, according to some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses, and methods are provided herein useful to selecting tools and drones for completing a task. In some embodiments, the system comprises an autonomous vehicle, wherein the autonomous vehicle is configured to transport the tools and the drones to a location, and wherein the autonomous vehicle includes a plurality of sensors configured to detect properties of the tools and the drones, the drones, the tools, and a control circuit, the control circuit configured to receive, from the sensors, indications of the properties of the tools and the drones, select, based on the service requests and the indications of the properties of the tools and the drones, at least one of the tools and at least one of the drones to perform at least one of the service requests, cause the at least one of the drones to be equipped with the at least one of the tools, and transmit instructions to the at least one of the drones, wherein the instructions are based on the at least one of the service requests.

As previously discussed, the currently available automated devices that perform tasks in and around a person's home, office, business, etc. are quite limited. Additionally, the existing automated devices perform only a single task. For example, while an automated vacuum may aid a person in maintaining the cleanliness of carpet in his or her home, the automated vacuum cannot easily perform any other tasks, such as mowing the person's lawn, trimming his or her hedges, etc. Consequently, a need exists for a system that can autonomously perform a wide variety of tasks in and around a person's home, office, and/or business.

Embodiments of the systems, methods, and apparatuses described herein seek to provide more useful autonomous systems for performing tasks by autonomously providing a variety of drones and tools that can be used and operated by the drones. The system receives service requests and selects drones and tools based on the service requests. The service request can be for any type of task around a person's property, such as lawn care, monitoring, cleaning, painting, maintenance, etc. For example, if the service request is to mow a lawn, the system will select a drone that is appropriate for mowing the lawn (e.g., a drone with the ability to traverse grassy surfaces) as well as a tool appropriate for mowing a lawn (e.g., a blade tool that can be affixed to the selected drone). Additionally, the system can assess properties associated with the tools and the drones (e.g., the condition, power availability, etc.) and include these properties when selecting drones and tools to perform the service request (i.e., tasks associated with the service request). The discussion of FIG. 1 provides and overview of such a system.

FIG. 1 depicts a portion of an autonomous vehicle 110 transporting drones and tools 112, according to some embodiments. The autonomous vehicle 110 can be any type of vehicle (e.g., a land-based, aerial, or aquatic vehicle) suitable for carrying the drones and the tools 112. The autonomous vehicle 110 depicted in FIG. 1 includes a flat surface or trailer for transporting the drones. The drones can include any suitable type of drone, such as land-based drones 104, aerial drones 108, and aquatic drones. In addition to transporting the drones, the autonomous vehicle 110 also transports the tools 112. For example, the autonomous vehicle 110 can transport the tools 112 in a cabinet 102, or other suitable compartment or container. The drones are configured to be equipped with the tools 112. For example, one of the aerial drones 108 can be equipped with a painting tool. So equipped, the one of the aerial drones 108 can apply paint to a surface, such as a house. In addition to transporting the drones and tools 112, the autonomous vehicle 100 can also manage, diagnose problems with, and maintain the drones, tools 112, and service requests.

The autonomous vehicle 110 also includes a plurality of sensors (e.g., cabinet-mounted sensors 114). The sensors are configured to detect properties of the tools 112 and the drones. For example, the properties of the tools 112 and the drones can include availability of the tools 112, condition of the tools 112, type of the tools 112, compatibility of the tools 112 with one or more of the drones, compatibility of the tools 112 with customer instructions, compatibility of the tools 112 with external conditions, availability of the drones, condition of the drones, type of the drones, compatibility of the drones with one or more of the tools 112, compatibility of the drones with customer instructions, compatibility of the drones with external conditions, power level of the drones, conditions of the service, etc. The sensors can include optical sensors, auditory sensors, motion sensors, haptic sensors, weight sensors, temperature sensors, material sensors, etc. The sensors can be located on the autonomous vehicle 110, on the drones, and/or on the tools 112. For example, a weight sensor located in the cabinet 102 can be used to determine if a tool is present, a voltmeter can be located on one of the drones to determine a power level of the drone, etc.

In some embodiments, the tools 112 are modular. For example, each drone may have a common attachment type that allows attachments of any of the tools 112 to any of the drones. Alternatively, there may be a small number of attachment types (e.g., three different attachment types). In such embodiments the tools 112 may be modular, but only capable of being connected to the correct attachment type.

The drones and the tools 112 are determined based on the service requests and indications of the properties of the tools 112 and the drones. For example, a service request may include two tasks: a first task to trim the hedges and a second task to wash the windows. An appropriate drone and an appropriate tool will be selected for each task, taking into consideration the properties of the tools 112 and the drones. For example, both of the land-based drones 104 may be suitable for trimming the hedges. However, only one of the two land-based drones 104 has sufficient power reserves to complete the task. Consequently, that land-based drone 104 will be selected. This assessment can further be based on external information. For example, if it is known that the person's house is quite large and includes extensive hedging, the system can calculate how much power is required to complete the entire task. In selecting the appropriate tool, the system can also consider in the indications of the properties of the tools 112. For example, if four hedge trimmer tools 112 are available, but only two are compatible with the selected drone, then one of those two will be selected. Further, if one of those two is dull, the system will select the sharper of the two to be used. The system can repeat this process and select an appropriate drone for the window washing task, possibly one of the aerial drones 108, and an appropriate tool for the window washing task, possibly a squeegee-type tool.

After selecting the drone and the tool, the system causes the drone to be equipped with the tool. Continuing the example above, the system causes the one of the land-based drones 104 with sufficient power reserves with the hedge trimmer tool that is both compatible with the selected drone and sharp. In some embodiments, the system can select multiple drones and multiple tools 112 for a single task. For example, the system can select two drones to cooperatively use a single tool, two drones to use separate tools 112 to cooperatively complete a task, etc.

After selecting the drones and the tools 112, the system provides the drones with instructions to complete the service request. In some embodiments, the system monitors the drones' progress as the drones complete the service requests. For example, the system can monitor the properties of the tools 112 and the drones, customer feedback, environmental conditions, etc. while the drones complete the service tasks. If a change occurs, the system can react by modifying the instructions, selecting new drones, and/or selecting new tools 112.

Figure 2:
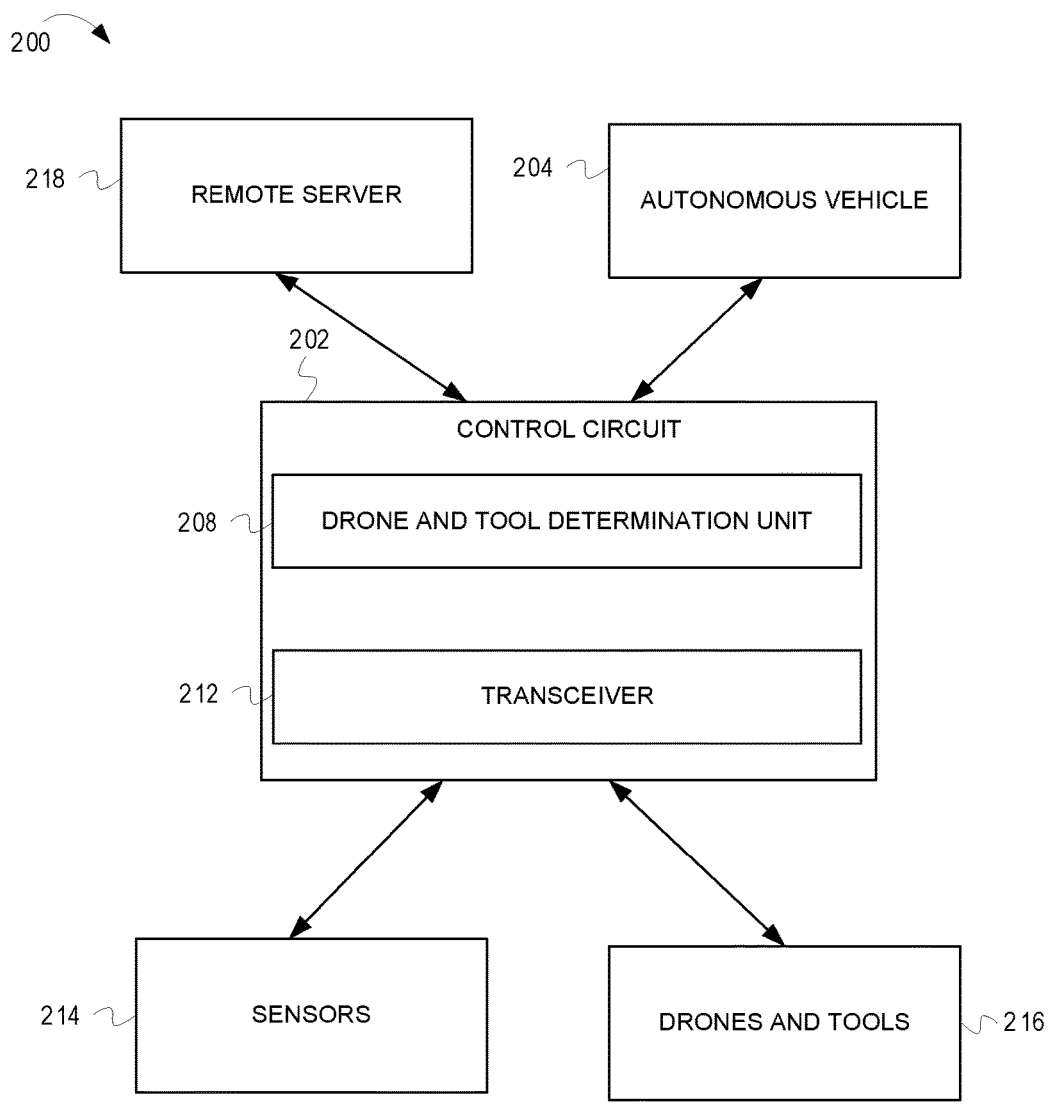
FIG. 2 is a block diagram of a system 200 for autonomously delivering drones and tools 216, according to some embodiments.

While the discussion of FIG. 1 provides an overview of a system for selecting drones and tools for completing a task, the discussion of FIG. 2 provides greater detail about such a system.

FIG. 2 is a block diagram of a system 200 for autonomously delivering drones and tools 216, according to some embodiments. The system includes a control circuit 202, an autonomous vehicle 204, sensors 214, and drones and tools 216. The control circuit 202 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. The control circuit 202 is configured (for example, by using corresponding programming as will be well understood by those skilled in the art) to carry out one or more of the steps, actions, and/or functions described herein.

By one optional approach the control circuit 202 operably couples to a memory. The memory may be integral to the control circuit 202 or can be physically discrete (in whole or in part) from the control circuit 202 as desired. This memory can also be local with respect to the control circuit 202 (where, for example, both share a common circuit board, chassis, power supply, and/or housing) or can be partially or wholly remote with respect to the control circuit 202 (where, for example, the memory is physically located in another facility, metropolitan area, or even country as compared to the control circuit 202).

This memory can serve, for example, to non-transitorily store the computer instructions that, when executed by the control circuit 202, cause the control circuit 202 to behave as described herein. As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).

The control circuit 202 includes a drone and tool determination unit 208 and a transceiver 212. The drone and tool determination unit 208 selects drones and tools. The drone and tool determination unit selects the drones and the tools based on service requests and indications of properties of the drones and the tools. The control circuit 202 receives the indications of the properties of the drones and the tools from the sensors 214 via the transceiver 212. The sensors 214 can be any suitable type of sensor, such as optical sensors, auditory sensors, motion sensors, haptic sensors, weight sensors, temperature sensors, etc. The sensors 214 can be located on the autonomous vehicle 204 and/or the drones and tools 216. The properties of the tools and the drones can include availability of the tools, condition of the tools, type of the tools, compatibility of the tools with one or more of the drones, compatibility of the tools with customer instructions, compatibility of the tools with external conditions, availability of the drones, condition of the drones, type of the drones, compatibility of the drones with one or more of the tools, compatibility of the drones with customer instructions, compatibility of the drones with external conditions, power level of the drones, etc. After selecting the drones and the tools to complete the service request (i.e., tasks associated with the service request), the control circuit 202 transmits instructions to the selected drones via the transceiver 212. The instructions are based on the service requests. For example, the instructions can include locations of the task to be located, special instructions for the tasks, parameters for the tasks, modifications based on external conditions, etc.

The control circuit 202 can be located on the autonomous vehicle 204 or remotely from the autonomous vehicle 204. In embodiments where the control circuit 202 is located remotely from the autonomous vehicle 204, the control circuit 202 may be associated with multiple autonomous vehicles 204. That is, the control circuit 202 may select drones and tools located on the multiple autonomous vehicles 204. For example, the control circuit can perform such actions for a first group of service requests for a first autonomous vehicle 204 in a first location as well as for a second group of service requests for a second autonomous vehicle 204 in a second location.

In some embodiments, the system 200 also includes a remote serve 218, such as a weather server (e.g., to provide weather information for the areas in which the drones and tools are to be used) or a customer information server (e.g., to provide customer profile information, such as an addresses, preferences, etc.). The remote server 218 provides external information to the control circuit 202 via the transceiver 212. In embodiments in which the system 200 includes the remote server 218, the drone and tool termination unit 208 can take into account information received from the remote server 218 when selecting drones and tools.

Figure 3:
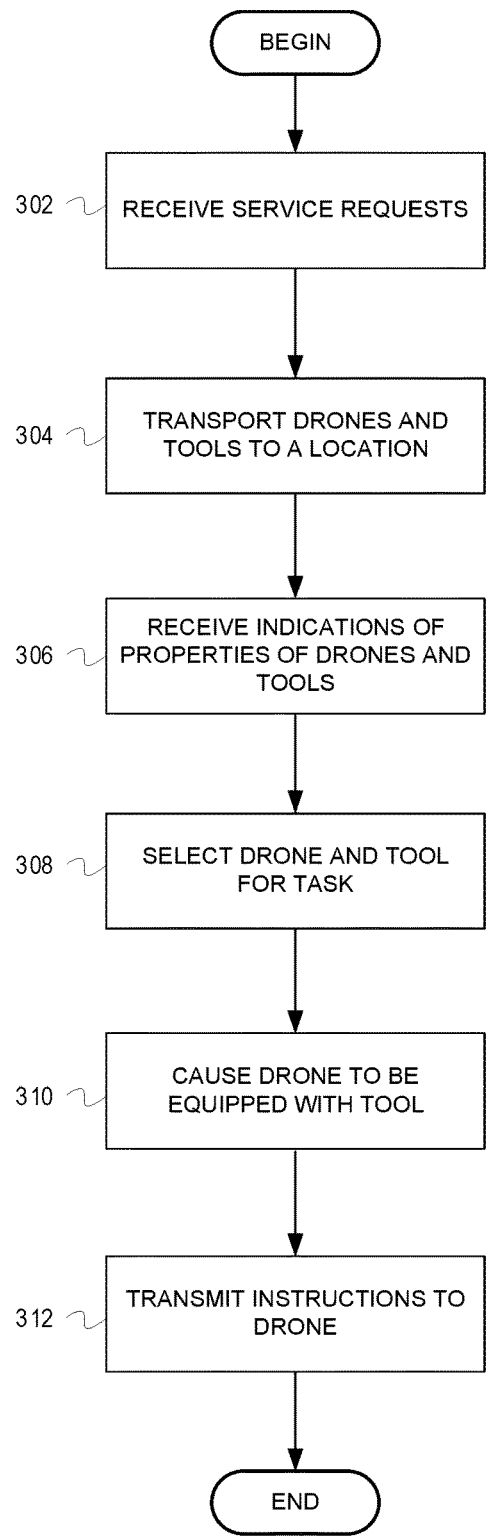
FIG. 3 is a flow diagram including example operations for autonomously delivering drones and tools, according to some embodiments.

While the discussion of FIG. 2 provides additional information about a system for selecting drones and tools for completing a task, the discussion of FIG. 3 describes example operations for selecting drones and tools for completing a task.

FIG. 3 is a flow diagram including example operations for autonomously delivering drones and tools, according to some embodiments. The flow begins at block 302.

At block 302, service requests are received. For example, a control circuit can receive the service requests. The service requests include information about tasks to perform. The service request can include a location of a task to perform (e.g., a person's home, office, workplace, etc.), a task to perform (e.g., painting, cleaning, maintenance work, etc.), a time to complete the task, as well as any special instructions for completing the task (e.g., information required to gain access to the property). The control circuit can be local to an autonomous vehicle transporting drones and tools for completing tasks. In such embodiments, the service requests can be routed to the autonomous vehicle based on the location of the autonomous vehicle, a proposed schedule for the autonomous vehicle, the drones and/or tools transported by the autonomous vehicle, the condition of the drones and/or tools transported by the autonomous vehicle, etc. In other embodiments, the control circuit is remote from the autonomous vehicle. In such embodiments, the control circuit may receive service requests that will be completed by drones and tools associated with multiple autonomous vehicles. The flow continues at block 304.

At block 304, the tools and the drones and the tools are transported to a location. For example, the autonomous vehicle can transport the drones and the tools to the location. The location is based one or more service requests. For example, the location could a home at which tasks associated with a service request are to be completed. Additionally, or alternatively, the location could be a selected spot from which multiple drones and tools will be dispatched to completed tasks associated with multiple service requests (e.g., a location that is central to addresses associated with numerous service requests). The flow continues at block 306.

At block 306, indications of properties of the drones and the tools are received. For example, the control circuit can receive indications of the properties of the drones and the tools from sensors. The properties of the tools and the drones can include availability of the tools, condition of the tools, type of the tools, compatibility of the tools with one or more of the drones, compatibility of the tools with customer instructions, compatibility of the tools with external conditions, availability of the drones, condition of the drones, type of the drones, compatibility of the drones with one or more of the tools, compatibility of the drones with customer instructions, compatibility of the drones with external conditions, power level of the drones, etc. Additionally, in some embodiments, the properties of the tools can include restrictions on the usage of the tools and/or the drones. For example, certain ones of the drones may not be permitted to use ones of the tools, or certain tools may be restricted from use on certain projects. The flow continues at block 308.

At block 308, drones and tools are selected. For example, the control circuit can select the drones and the tools. The control circuit selects drones and tools that are suitable (i.e., appropriate from completing tasks associated with the service request). For example, the control circuit can select the drones and the tools based on the service requests and the indications of the properties of the tools and the drones. Additionally, the control circuit can select the drones and the tools based on weather, time of day, environmental conditions (a rocky or wet area), proximity of objects (e.g., how close a house is to a tree), and customer instructions, etc. In some embodiments, the drone and/or the tool are selected based on prioritization and/or optimization of the tasks, tools, and drones. For example, the choice between two or more similar options can be further refined through criteria. The criteria can be related to conditions, scheduling (e.g., anticipated availability of tools and/or drones), priority, a measure of suitability for the tasks (e.g., a small shovel tool is more suitable for planting flowers than a large shovel tool), etc. Further, in some embodiments, an indication can be transmitted if a suitable drone and/or tool cannot be selected. For example, the notification can be transmitted to the customer, a central sever, etc. Based on this notification, performance of the tasks can be rescheduled or delayed, additional resources can be requested, etc. The flow continuous at block 310.

A block 310, the drone is caused to be equipped with the tool. For example, the control circuit can cause the drone to be equipped with the tool. The drone can be caused to be equipped with the tool by causing the tool to be placed at a retrieval point, causing the tool to be physically affixed or connected to the drone, and/or assigning the tool to the drone. The tools can be affixed or connected to the drones magnetically, mechanically, etc. The drones and tools can be modular so that each tool is compatible with a wide variety of drones. Additionally, in some embodiments, two or more drones can be equipped with a single tool and work cooperatively to operate the tool. In such embodiments, the two or more drones can operate with a "master/slave" relationship in which one or more of the drones control the operation of one or more other drones with which they are operating cooperatively. Additionally, the drones can use blockchain as a secure mechanism for facilitating work between the two or more drones. The flow continues at block 312.

At block 312, instructions are transmitted to the drone. For example, the control circuit transmit the instructions to the drone. The instructions are based on the service requests. For example, the instructions can include locations of the task to be located, special instructions for the tasks, parameters for the tasks, modifications based on external conditions, etc. In some embodiments, the control circuit can monitor the drones and/or the tools while the drones are completing tasks based on the service requests. Additionally, in some embodiments, people (i.e., customers) can monitors the drones' progress as well and provide feedback. In such embodiments, the control circuit can update and provide new instructions to the drones based on a change in conditions, such as the weather, customer feedback, an additional task to be performed, etc. In addition to transmitting the instructions to the drone, in some embodiments, the control circuit can transmit the instructions to a central server, the tools, and/or the customer. Further, if the instructions are updated (e.g., based on updates a remote server or the customer), the control circuit can transmit updating instructions to the drones.

In some embodiments, the drones, after using the tools, return the tools to the autonomous vehicle. For example, a drone can be unequipped with the tool and the tool can be returned to the autonomous vehicle. Additionally, the drones can clean the tools before returning the tools to the autonomous vehicle. As one example, the drones can return the tools to a cabinet on the autonomous vehicle after the drone cleans the tools.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

In some embodiments, the system comprises an autonomous vehicle, wherein the autonomous vehicle is configured to transport the tools and the drones to a location, and wherein the autonomous vehicle includes a plurality of sensors configured to detect properties of the tools and the drones, the drones, the tools, and a control circuit, the control circuit configured to receive, from the sensors, indications of the properties of the tools and the drones, select, based on the service requests and the indications of the properties of the tools and the drones, at least one of the tools and at least one of the drones to perform at least one of the service requests, cause the at least one of the drones to be equipped with the at least one of the tools, and transmit instructions to the at least one of the drones, wherein the instructions are based on the at least one of the service requests.

In some embodiments, an apparatus and a corresponding method performed by the apparatus, comprises receiving service requests, transporting, via an autonomous vehicle, the tools and the drones to a location associated with at least one of the service requests, receiving, from a plurality of sensors associated with the autonomous vehicle, indications of properties of the tools and the drones, selecting, based on the at least one of the service requests and the indications of the properties of the tools and the drones, at least one of the tools and one of the drones to perform the at least one of the service requests, causing the at least one of the drones to be equipped with the at least one of the tools, and transmitting instructions to the at least one of the drones, wherein the instructions are based on the at least one of the service requests.

What is claimed is:

1. A system for selecting tools and drones for completing a task, the system comprising:
    an autonomous vehicle, wherein the autonomous vehicle is configured to transport the tools and the drones to a location, and wherein the autonomous vehicle includes a plurality of sensors configured to detect properties of the tools and the drones;
    the drones;
    the tools; and
    a control circuit, the control circuit configured to:
        receive service requests;
        receive, from the sensors, indications of the properties of the tools and the drones;
        select, based on the service requests and the indications of the properties of the tools and the drones, at least one of the tools and at least one of the drones to perform at least one of the service requests;
        cause the at least one of the drones to be equipped with the at least one of the tools; and
        transmit instructions to the at least one of the drones, wherein the instructions are based on the at least one of the service requests.

2. The system of claim 1, wherein the control circuit is further configured to:
    monitor, as the at least one drone performs the at least one of the service requests, the properties of the tools and the drones.

3. The system of claim 2, wherein the control circuit is further configured to:
    determine that a change has occurred with respect to one or more of the properties of the tools and the drones; and
    select, based on the change, at least one of a new drone and a new tool.

4. The system of claim 1, wherein the properties of the tools include one or more of availability of the tools, condition of the tools, type of the tools, compatibility of the tools with one or more of the drones, compatibility of the tools with customer instructions, and compatibility of the tools with external conditions.

5. The system of claim 1, wherein the properties of the drones include one or more of availability of the drones, condition of the drones, type of the drones, compatibility of the drones with one or more of the tools, compatibility of the drones with customer instructions, compatibility of the drones with external conditions, and power level of the drones.

6. The system of claim 1, wherein the selection of the at least one of the tools and at least one of the drones is further based on external conditions.

7. The system of claim 6, wherein the external conditions are one or more of weather, time of day, environmental conditions, proximity of objects, and customer instructions.

8. The system of claim 1, wherein the plurality of sensors include one or more of optical sensors, auditory sensors, motion sensors, haptic sensors, weight sensors, and temperature sensors.

9. The system of claim 1, wherein the control circuit is further configured to:

receive, from a customer, feedback, and wherein the selection of the at least one of the tools and at least one of the drones is further based on the customer feedback.

10. The system of claim 9, wherein the control circuit is further configured to:
receive, from a customer, customer feedback; and
modify, based on the customer feedback, the instructions.

11. A method for selecting tools and drones for completing a task, the method comprising:
receiving service requests;
transporting, via an autonomous vehicle, the tools and the drones to a location associated with at least one of the service requests;
receiving, from a plurality of sensors associated with the autonomous vehicle, indications of properties of the tools and the drones;
selecting, based on the at least one of the service requests and the indications of the properties of the tools and the drones, at least one of the tools and one of the drones to perform the at least one of the service requests;
causing the at least one of the drones to be equipped with the at least one of the tools; and
transmitting instructions to the at least one of the drones, wherein the instructions are based on the at least one of the service requests.

12. The method of claim 11, further comprising:
monitoring, as the least one drone performs the at least one of the service requests, the properties of the tools and the drones.

13. The method of claim 12, further comprising:
determining that a change has occurred with respect to one or more of the properties of the tools and the drones; and
selecting, based on the change, at least one of a new drone and a new tool.

14. The method of claim 11, wherein the properties of the tools include one or more of availability of the tools, conditions of the tools, type of the tools, compatibility of the tools with the one or more of the drones, compatibility of the tools with the customer instructions, and compatibility of the tools with external conditions.

15. The method of claim 11, wherein the properties of the drones include one or more of availability of the drones, conditions of the drones, type of the drones, compatibility of the drones with one or more of the tools, compatibility of the drones with customer instructions, compatibility of the drones with external conditions, and power level of the drones.

16. The method of claim 11, wherein the selecting the at least one of the tools and at least one of the drones is further based on external conditions.

17. The method of claim 16, wherein the external conditions are one or more of weather, time of day, environmental conditions, proximity of objects, and customer instructions.

18. The method of claim 11, wherein the plurality of sensors include one or more of optical sensors, auditory sensors, motion sensors, haptic sensors, and temperature sensors.

19. The method of claim 11, further comprising:
receiving, from a customer, customer feedback, wherein the selection of the at least one of the tools and at least one of the drones is further based on the customer feedback.

20. The method of claim 11, further comprising:
receiving, from a customer, customer feedback; and
modifying, based on the customer feedback, the instructions.

* * * * *